(12) United States Patent
Allen et al.

(10) Patent No.: US 9,805,113 B2
(45) Date of Patent: Oct. 31, 2017

(54) INTELLIGENT INDEXING

(71) Applicant: International Business Machines Corporation, Armonk, NY (US)

(72) Inventors: Corville O. Allen, Durham, NC (US);
Denis F. Brodeur, Markham (CA);
Richard W. Gregory, Markham (CA);
Visweswara S. Induri, San Ramon, CA (US)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 13/894,478

(22) Filed: May 15, 2013

(65) Prior Publication Data

US 2014/0344212 A1     Nov. 20, 2014

(51) Int. Cl.
*G06F 7/00*     (2006.01)
*G06F 17/00*    (2006.01)
*G06F 17/30*    (2006.01)

(52) U.S. Cl.
CPC ............. *G06F 17/30613* (2013.01)

(58) Field of Classification Search
None
See application file for complete search history.

(56) References Cited

U.S. PATENT DOCUMENTS

| | | | |
|---|---|---|---|
| 6,643,639 B2 | 11/2003 | Biebesheimer et al. | |
| 8,578,274 B2* | 11/2013 | Druzgalski et al. | 715/738 |
| 2003/0212654 A1* | 11/2003 | Harper et al. | 707/1 |
| 2004/0023634 A1* | 2/2004 | Jeong et al. | 455/403 |
| 2004/0267693 A1* | 12/2004 | Lowe et al. | 707/1 |
| 2006/0248063 A1* | 11/2006 | Gordon | 707/3 |
| 2006/0259481 A1* | 11/2006 | Handley | 707/5 |
| 2010/0035682 A1* | 2/2010 | Gentile et al. | 463/30 |
| 2013/0295989 A1* | 11/2013 | Smadi et al. | 455/553.1 |

FOREIGN PATENT DOCUMENTS

| | | |
|---|---|---|
| CN | 102624843 A | 8/2012 |
| KR | 1020060087617 A | 8/2006 |
| WO | 0139029 A2 | 5/2001 |

OTHER PUBLICATIONS

Gong, R-N. et al.; "Context modeling for business collaboration"; Computer Integrated Manufacturing Systems, vol. 15, No. 9, English language Abstract (p. 1731), pp. 1731-1737, Sep. 2009.

(Continued)

*Primary Examiner* — Susan Chen
(74) *Attorney, Agent, or Firm* — Jordan IP Law, LLC

(57) ABSTRACT

Methods and systems may provide for monitoring shared content for changes by a plurality of users and selecting a subset of the shared content based on one or more collaboration characteristics associated with the changes by the plurality of users. In addition, an indexing schedule may be determined for the subset of the shared content based on the one or more collaboration characteristics. In one example, the collaboration characteristics include one or more user roles associated with one or more of the plurality of users, an operation type, a number of users making the changes and/or a frequency of the changes by the plurality of users.

13 Claims, 3 Drawing Sheets

(56) References Cited

OTHER PUBLICATIONS

Krawczyk, H. et al.; "Intelligent information search in Internet"; Studia Informatica, vol. 23, No. 2B, English language Summary (p. 13) and Abstract (pp. 24-25) pp. 13-25, 2002.
Petraki, Eleni, "Holistic Indexing: Offline, Online and Adaptive Indexing in the Same Kernel," SIGMOD/PODS '12 PhD Symposium, May 20, 2012, pp. 15-19, Scottsdale AZ, USA.
Kobbacy, Khairy A. H., "Application of Artificial Intelligence in Maintenance Modeling and Management," 6 pages, 2012.

* cited by examiner

INTELLIGENT INDEXING

BACKGROUND

Embodiments of the present invention may generally relate to data indexing. More particularly, embodiments may relate to the use of collaboration characteristics to optimize the indexing of data.

Collaborative software development environments may involve multiple users accessing and modifying shared content, wherein indexing the content may facilitate the search and retrieval of data by the users. Conventional indexing techniques, however, may render suboptimal performance (e.g., traditional on-demand indexing) and/or inaccurate results (e.g., traditional scheduled indexing), particularly when a large set of data is being accessed by users of disparate roles in the development process.

BRIEF SUMMARY

Embodiments may include a computer program product having a computer readable storage medium and computer usable code stored on the computer readable storage medium. If executed by a processor, the computer usable code may cause a computer to monitor shared content for changes by a plurality of users, and select a subset of the shared content based on one or more collaboration characteristics associated with the changes by the plurality of users. The computer usable code, if executed, may also cause a computer to determine an indexing schedule for the subset of the shared content based on the one or more collaboration characteristics.

Embodiments may include a computer implemented method in which shared content is monitored for changes by a plurality of users. The method may also provide for selecting a subset of the shared content based on collaboration characteristics associated with the changes by the plurality of users, wherein the collaboration characteristics may include one or more user roles associated with one or more of the plurality of users, an operation type, a number of users making the changes and a frequency of the changes by the plurality of users. Additionally, an indexing schedule may be determined for the subset of the shared content based on the collaboration characteristics. The method may also provide for indexing the subset of the shared content according to the indexing schedule.

Embodiments may include a computer program product having a computer readable storage medium and computer usable code stored on the computer readable storage medium. If executed by a processor, the computer usable code may cause a computer to monitor shared content for changes by a plurality of users and select a subset of the shared content based on collaboration characteristics associated with the changes by the plurality of users. The collaboration characteristics may include one or more user roles associated with one or more of the plurality of users, an operation type, a number of users making the changes and a frequency of the changes by the plurality of users. The computer usable code, if executed, may also cause a computer to determine an indexing schedule for the subset of the shared content based on the collaboration characteristics, and index the subset of the shared content according to the indexing schedule.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
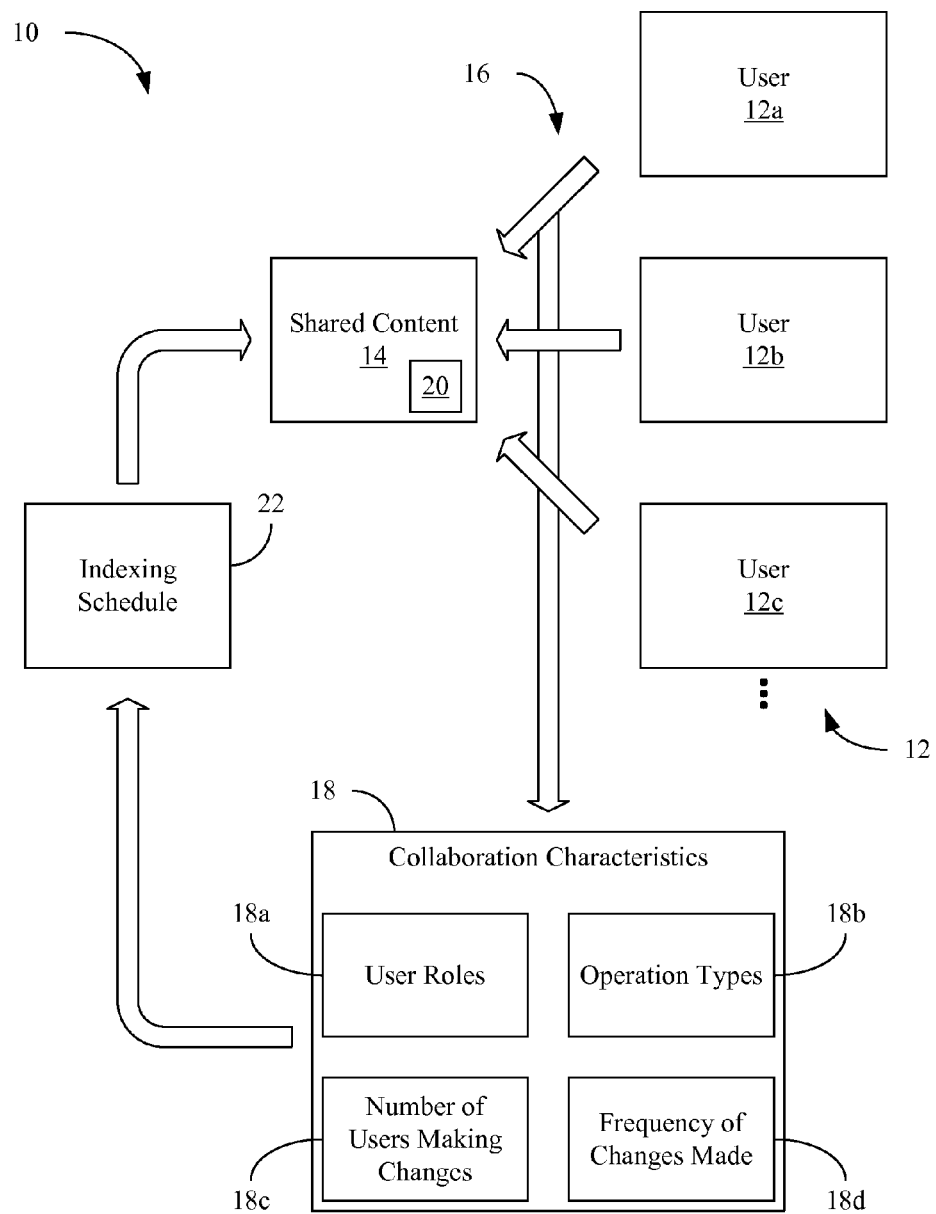
FIG. 1 is a block diagram of an example of a collaborative development environment according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a collaborative development environment 10 is shown in which a plurality of users 12 (12a-12c) create, search for, retrieve and make changes to shared content 14. The shared content 14 may include, for example, software development content such as content related to the development of business processes. Thus, the shared content 14 may include various software tools and/or applications that enable the creation, editing, integration, execution, monitoring and/or maintenance of a business process. As will be discussed in greater detail, the users 12 may have disparate roles with regard to the shared content 14. For example, a first user 12a might be a developer (e.g., programmer role) of the shared content 14, a second user 12b might have the role of analyst (e.g., subject matter expert), a third user 12c might have the role of administrator of the shared content 14, and so forth.

Content Selection

In the illustrated example, as the users 12 make changes 16 to the shared content 14, various collaboration characteristics 18 (18a-18d) associated with the changes 16 may be identified and used to select a subset 20 of the shared content 14 for indexing. In general, selecting only the subset 20 of the shared content 14 may enable the indexing to be performed more quickly and in turn enhance performance.

The collaboration characteristics 18 may include, for example, one or more user roles 18a associated with one or more of the users 12, operation type information 18b corresponding to the changes 16, the number of users 18c making the changes 16, the frequency 18d of the changes 16 by the users 12, and so forth. For example, with regard to the user roles 18a, it may be determined that a certain user role (e.g., developer) may be more likely to access particular types of artifacts (e.g., development tools, applications and/or data) in the shared content 14 and less likely to access other types of artifacts (e.g., administrative tools, applications and/or data). Accordingly, the user roles 18a may be used to select only the most relevant types of data/artifacts for indexing. Of particular note is that although the subset 20 may include the artifacts that were subjected to the changes 16 made by the users 12, the scope of the subset 20 may be broader than the changed artifacts, although typically narrower than the entire shared content 14.

Additionally, the collaborative nature of certain roles may also be taken into consideration. For example, it might be determined from the user roles 18a that a group of developers and administrators are concurrently logged in and/or making changes to the shared content. In such a case, potential developer interest (or disinterest) in administrator-related artifacts, and vice versa, may be factored into the selection of the subset 20 of the shared content 14. Thus, the scope of the subset 20 might be expanded to include administrator-related artifacts for the benefit of developers if developers are likely to be interested in those artifacts, or contracted to exclude administrator-related artifacts if developers are not likely to be interested in those artifacts (and administrators are no longer logged into the system).

In addition, the operation type information 18b may indicate the types of operations being performed by the changes 16. For example, the operation type information 18b might indicate that the second user 12b (e.g., analyst, subject matter expert) made a process integration-related change to one or more artifacts in the shared content 14. In such a case, the subset 20 of the shared content 14 may be configured and/or selected to include all process integration-related artifacts. Similarly, the operation type information 18b could indicate that the third user 12c (e.g., administrator) made a process monitoring-related change to one or more artifacts in the shared content 14, wherein such a change may cause process monitoring-related artifacts to be included in the subset 20 of the shared content 14. In this regard, different users may use different tools and/or interfaces to access the shared content 14.

The number of users 18c making the changes 16 may also be used to select the subset 20 of the shared content 14. For example, if a relatively large number of users are making the changes 16 to the shared content 14 (e.g., user volume is above an upper threshold), then the size of the subset 20 may be increased in order to account for the likelihood that a broader scope of artifacts may need to be indexed. Similarly, if a relatively small number of users are making the changes 16 to the shared content 14 (e.g., user volume is below a lower threshold), then the size of the subset 20 may be decreased in order to reduce the scope of artifacts being indexed.

Additionally, the frequency 18d of the changes 16 may be used to select the subset 20 of the shared content 14. For example, if the changes 16 are being made at a relatively high frequency (e.g., change frequency is above an upper threshold), then the size of the subset 20 may be increased in order to account for the likelihood that a broader scope of artifacts may need to be indexed. Similarly, if the changes 16 are being made at a relatively low frequency (e.g., change frequency is below a lower threshold), then the size of the subset 20 may be decreased in order to reduce the scope of artifacts being indexed. As already noted, increasing the size of the subset 20 may improve accuracy, whereas decreasing the size of the subset 20 may enhance performance. Accordingly, the illustrated approach may provide an intelligent solution to selecting artifacts for indexing that takes into consideration the collaborative nature of content development.

Schedule Adaptation

Moreover, the collaboration characteristics 18 may be used to determine and/or modify an indexing schedule 22 for the subset 20 of the shared content 14. For example, with regard to the user roles 18a, it may be determined that a first user role (e.g., developer) may typically edit artifacts in the shared content 14 at a higher rate than a second user role (e.g., analyst, subject matter expert). Thus, if it is determined that users in the first user role are logged into the development system and/or making the changes 16, the indexing schedule 22 may be modified to decrease the amount of time between indexing operations (increase the indexing frequency by, e.g., scheduling an immediate indexing, scheduling the next indexing to occur sooner, etc.). In one example, scheduling the next indexing to occur sooner involves scaling the amount of time between indexing operations downward (e.g., 50% decrease). Similarly, if it is determined that users in the second user role are logged into the development system and/or making the changes 16, the indexing schedule 22 may be modified to increase the amount of time between indexing operations (decrease the indexing frequency by, e.g., scheduling the next indexing to occur later, canceling the next indexing, etc.). In one example, scheduling the next indexing to occur later involves scaling the amount of time between indexing operations upward (e.g., 50% increase). The scale of the time decrease and/or increase may be tailored to the type of user role(s) involved.

The collaborative nature of certain roles may also be taken into consideration for the indexing schedule 22. For example, it may be determined from the user roles 18a that two developers are concurrently logged in and/or making changes to the same or different types of artifacts. If the same types of artifacts are being changed, the indexing frequency may be increased, whereas if different types of artifacts are being changed, the indexing frequency may be decreased.

Additionally, the operation type information 18b may indicate, for example, that the first user 12a (e.g., developer) made a process editing-related change to one or more artifacts in the shared content 14. If such a change is deemed to be a high priority operation (e.g., accuracy may be determined to be relatively important for process editing-related changes), the indexing schedule 22 might be modified to decrease the amount of time between indexing operations (e.g., increase the indexing frequency). The scale of the time decrease may be tailored to the type of operation (e.g., 20%, 30%, 40% decrease, depending upon the type of operation). If, on the other hand, the operation type information 18b indicates that accuracy is not as important for the changes 16, then the indexing schedule 22 may be modified to increase the amount of time between indexing operations (e.g., decrease the indexing frequency) in order to enhance performance. The scale of the time increase may also be tailored to the type of operation (e.g., 20%, 30%, 40% increase, depending upon the type of operation).

The number of users 18c making the changes 16 may also be used to determine the indexing schedule 22. For example, if a relatively large number of users are making the changes 16 to the shared content 14 (e.g., user volume is above an upper threshold), then the indexing schedule 22 might be modified to decrease the amount of time between indexing operations (e.g., increase the indexing frequency). Similarly, if a relatively small number of users are making the changes 16 to the shared content 14 (e.g., user volume is below a lower threshold), then the indexing schedule 22 might be modified to increase the amount of time between indexing operations (e.g., decrease the indexing frequency).

In addition, the frequency 18d of the changes 16 may be used to determine the indexing schedule. For example, if the changes 16 are being made at a relatively high frequency (e.g., change frequency is above an upper threshold), then the indexing schedule 22 may be modified to decrease the amount of time between indexing operations (e.g., increase the indexing frequency). Similarly, if the changes 16 are being made at a relatively low frequency (e.g., change frequency is below a lower threshold), then the indexing schedule 22 may be modified to increase the amount of time between indexing operations (e.g., decrease the indexing frequency). Other types of collaboration characteristics may also be used to select the subset 20 of the shared content 14 and determine the indexing schedule 22 for the selected subset 20.

Figure 2:
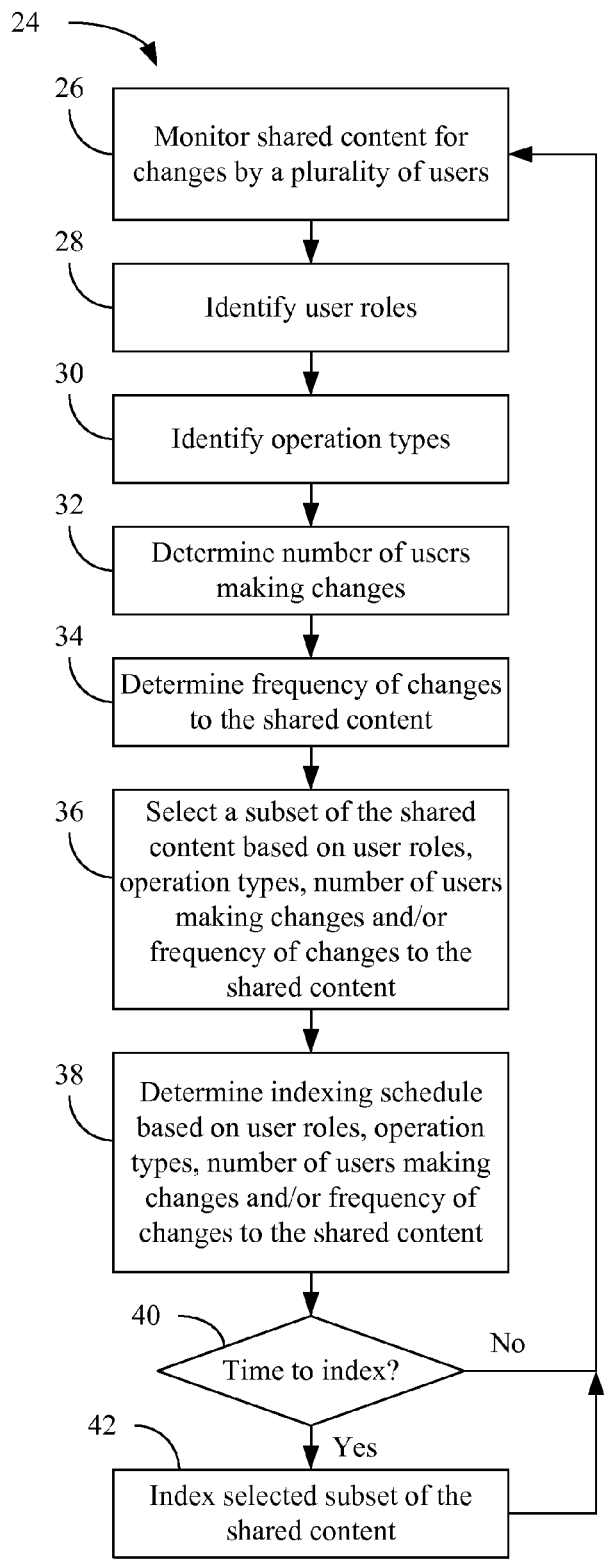
FIG. 2 is a flowchart of an example of a method of indexing content according to an embodiment.

FIG. 2 shows a method 24 of indexing content, wherein illustrated processing block 26 provides for monitoring shared content for changes by a plurality of users. One or more user roles associated with the plurality of users may be identified at block 28, and one or more operation types corresponding to the changes may be identified at block 30. Illustrated block 32 determines the number of users making the changes and the frequency of the changes by the plurality of users may be determined at block 34. Thus blocks 28, 30, 32, and 34 may therefore provide for identifying one or more collaboration characteristics associated with the changes by the plurality of users, as already discussed. The collaborative characteristics may be identified from message headers, command parameters, user profiles, and so forth.

Block 36 may provide for selecting a subset of the shared content based on one or more of the collaboration characteristics (e.g., user roles, operation types, number of users making changes, frequency of changes to the shared content, etc.). In addition, an indexing schedule may be determined at block 38 for the subset of the shared content based on the collaboration characteristics. Illustrated block 40 determines whether it is time to index the subset of the shared content based on the modified indexing schedule. If so, block 42 may index the selected subset of the shared content according to the indexing schedule. The illustrated method 24 may repeat to provide real-time monitoring and intelligent adaptation of the indexing schedule based on a dynamic collaboration state.

Figure 3:
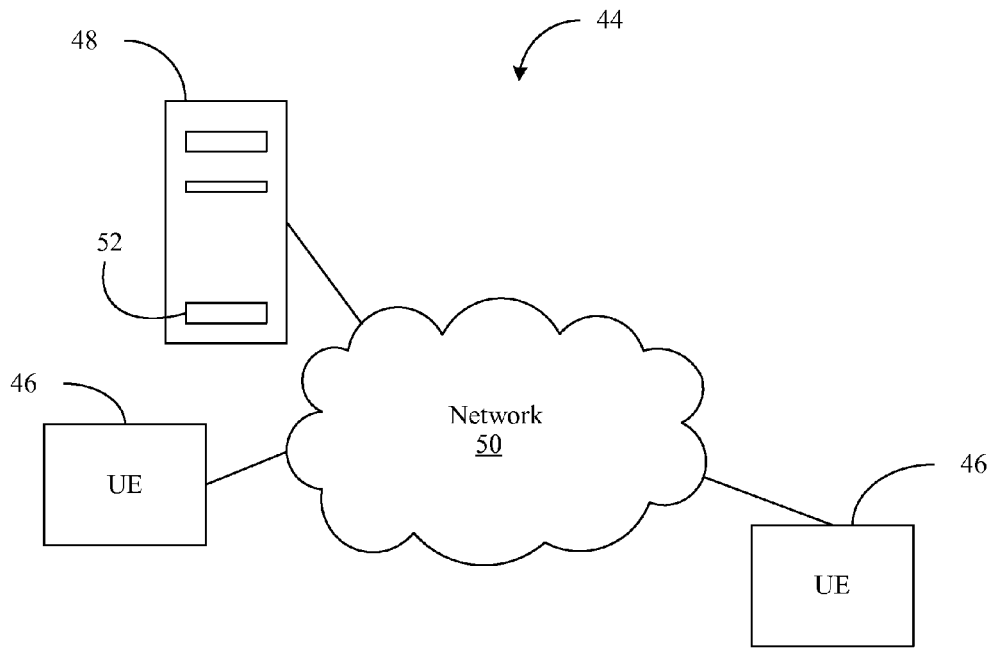
FIG. 3 is a block diagram of an example of a networking architecture according to an embodiment.

Turning now to FIG. 3, a networking architecture 44 is shown in which user equipment (UE) devices 46 (e.g., client devices) are configured to create, search for, retrieve and/or make changes to shared content on one or more servers such as a server 48 via a network 50. In the illustrated example, the network 50 may itself include any suitable combination of servers, access points, routers, base stations, mobile switching centers, public switching telephone network (PSTN) components, etc., to facilitate communication between the UE devices 46 and the server 48.

The illustrated server 48 includes an intelligent indexing module 52 configured to index the shared content as described with regard to one or more aspects of the method 24 (FIG. 2), already discussed. Accordingly, the intelligent indexing module 52 may monitor shared content for changes by a plurality of users associated with the UE devices 46, select a subset of the shared content based on one or more collaboration characteristics associated with the changes by the plurality of users, and determine an indexing schedule for the subset of the shared content based on the one or more collaboration characteristics.

Figure 4:
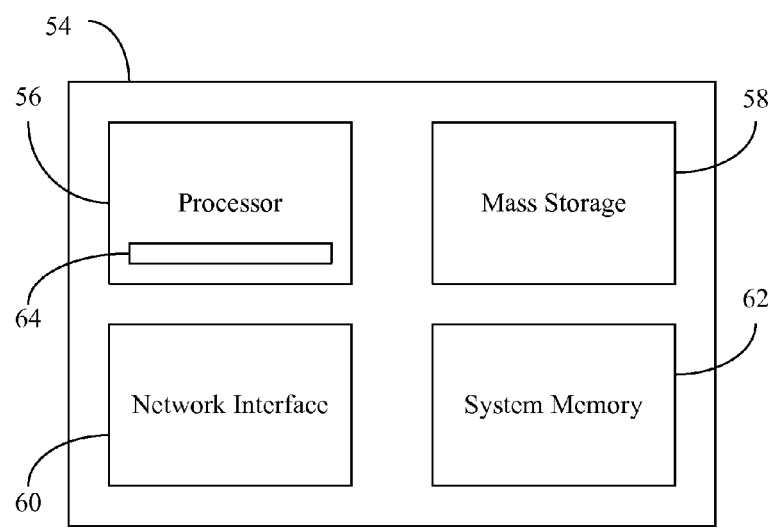
FIG. 4 is a block diagram of an example of a computing device according to an embodiment.

FIG. 4 shows a computing device 54 having a processor 56, mass storage 58 (e.g., read only memory/ROM, optical disk, flash memory), a network interface 60, and system memory 62 (e.g., random access memory/RAM). The computing device 54 may be readily substituted for the server 48 (FIG. 3), already discussed. In the illustrated example, the processor 56 is configured to execute logic 64, wherein the logic 64 may implement one or more aspects of the method 24 (FIG. 2) and/or the intelligent indexing module 52 (FIG. 3), already discussed. Thus, the logic 64 may enable the computing device 54 to monitor shared content for changes by a plurality of users, select a subset of the shared content based on one or more collaboration characteristics associated with the changes by the plurality of users, and determine an indexing schedule for the subset of the shared content based on the one or more collaboration characteristics. The logic 64 may also be implemented as a software application that is distributed among many computers (e.g., local or remote). Thus, while a single computer could provide the functionality described herein, systems implementing these features can use many interconnected computers (e.g., for scalability as well as modular implementation).

Techniques described herein may therefore leverage information about the collaborative nature of concurrent development operations to decide how often and what kind of data needs to be re-indexed. The techniques may be useful in environments having different points of entry (e.g., log-in type, tools being used) and users performing multiple different roles.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A computer implemented method comprising:
monitoring shared content on a server for changes by a plurality of users communicating with the server using user equipment wherein the shared content is one or more of a software tool or a software application;
selecting a subset of the shared content based on collaboration characteristics associated with the changes by the plurality of users, wherein the collaboration characteristics is one or more user roles associated with one or more of the plurality of users selected from a software developer, an analyst, or an administrator, an operation type selected from a process-related change to one or more artifacts in the shared content, a number of users making the changes or a frequency of the changes by the plurality of users;
using an intelligent indexing module on the server to determine an indexing schedule for the subset of the shared content based on the collaboration characteristics; and
indexing the subset of the shared content with the intelligent indexing module according to the indexing schedule wherein determining the indexing schedule includes:
increasing a frequency of the indexing schedule when the number of users making the changes or the frequency of the changes by the plurality of users is above a first threshold; and
decreasing the frequency of the indexing schedule when the number of users making the changes or the frequency of the changes by the plurality of users is below a second threshold.
2. The method of claim 1, wherein the one or more user roles include two or more disparate user roles associated with two or more of the plurality of users.
3. The method of claim 1, wherein the shared content includes development content.
4. A computer program product comprising:
a non-transitory computer readable storage medium; and
computer usable code stored on the computer readable storage medium, where, if when executed by a processor, the computer usable code causes a server to:
monitor shared content on the server for changes by a plurality of users communicating with the server through user equipment, wherein the shared content is one or more of a software tool or a software application;
select a subset of the shared content based on collaboration characteristics associated with the changes by the plurality of users, wherein the collaboration characteristics is one or more user roles associated with one or more of the plurality of users selected from a software developer, an analyst, or an administrator, an operation type selected from a process-related change to one or more artifacts in the shared content, a number of users making the changes or a frequency of the changes by the plurality of users;

use an intelligent indexing module on the server to determine an indexing schedule for the subset of the shared content based on the collaboration characteristics; and index the subset of the shared content according to the indexing schedule wherein determining the indexing schedule includes:

increasing a frequency of the indexing schedule when the number of users making the changes or the frequency of the changes by the plurality of users is above a first threshold; and decreasing the frequency of the indexing schedule when the number of users making the changes or the frequency of the changes by the plurality of users is below a second threshold.

5. The computer program product of claim 4, wherein the one or more user roles are to include two or more disparate user roles associated with two or more of the plurality of users.

6. The computer program product of claim 4, wherein the shared content is to include development content.

7. A computer program product comprising:

a non-transitory computer readable storage medium; and computer usable code stored on the computer readable storage medium, where, when executed by a processor, the computer usable code causes a server to:

monitor shared content on the server for changes by a plurality of users communicating with the server through user equipment wherein the shared content is one or more of a software tool or a software application;

select a subset of the shared content based on one or more collaboration characteristics associated with the changes by the plurality of users; and use an intelligent indexing module on the server to determine an indexing schedule for the subset of the shared content based on the one or more collaboration characteristics; and index the subset of the shared content according to the indexing schedule wherein determining the indexing schedule includes:

increasing a frequency of the indexing schedule when the number of users making the changes or the frequency of the changes by the plurality of users is above a first threshold; and decreasing the frequency of the indexing schedule when the number of users making the changes or the frequency of the changes by the plurality of users is below a second threshold.

8. The computer program product of claim 7, wherein the one or more collaboration characteristics are to include one or more user roles associated with one or more of the plurality of users and one or more types of artifacts corresponding to the one or more user roles.

9. The computer program product of claim 8, wherein the one or more user roles are to include two or more disparate user roles associated with two or more of the plurality of users.

10. The computer program product of claim 7, wherein the one or more collaboration characteristics are to include an operation type.

11. The computer program product of claim 7, wherein the one or more collaboration characteristics are to include a number of users making the changes.

12. The computer program product of claim 7, wherein the one or more collaboration characteristics are to include a frequency of the changes by the plurality of users.

13. The computer program product of claim 7, wherein the shared content is to include development content.

* * * * *